(12) United States Patent
Pishon (10) Patent No.: US 11,208,981 B1
(45) Date of Patent: Dec. 28, 2021

(54) DYNAMIC MOORING SYSTEM FOR WATER WAVE ENERGY CONVERTORS

(71) Applicant: Md. Nishanto Nahid Pishon, Oakville (CA)

(72) Inventor: Md. Nishanto Nahid Pishon, Oakville (CA)

( * ) Notice: Subject to any disclaimer, the term of this patent is extended or adjusted under 35 U.S.C. 154(b) by 0 days.

(21) Appl. No.: 16/931,583

(22) Filed: Jul. 17, 2020

(51) Int. Cl.
*F03B 13/00* (2006.01)
*F03B 13/18* (2006.01)

(52) U.S. Cl.
CPC ................................ *F03B 13/1885* (2013.01)

(58) Field of Classification Search
CPC  F03B 13/1875; F03B 13/187; F03B 13/1815; F03B 13/12; F03B 13/1885; F03B 13/14; F03B 13/189; F03B 13/26; F03B 13/262
USPC ...................................................... 290/42, 53
See application file for complete search history.

(56) References Cited

U.S. PATENT DOCUMENTS

| 2011/0012358 | A1* | 1/2011 | Brewster | F03B 13/20 290/53 |
| 2013/0008157 | A1* | 1/2013 | Zuo | F03B 13/18 60/497 |
| 2014/0219800 | A1* | 8/2014 | Lee | F03D 3/067 416/86 |
| 2015/0145250 | A1* | 5/2015 | Frtunik | H02K 7/1876 290/42 |
| 2019/0145373 | A1* | 5/2019 | Lehmann | F03B 13/20 290/53 |

* cited by examiner

*Primary Examiner* — Julio C. Gonzalez
(74) *Attorney, Agent, or Firm* — Nasser Ashgriz; UIPatent Inc.

(57) ABSTRACT

A dynamic adaptive mooring system for wave energy converters (WEC) is disclosed that has a mooring configuration that has a set of fixed mooring lines, and a set of movable mooring lines. When an incoming wave train interacts with the fixed WECs, a set of wave interference points that have higher wave amplitudes than the incoming wave train are formed downstream of the fixed WECs. The movable WECs are then positioned at the interface points to optimize wave energy transfer.

12 Claims, 7 Drawing Sheets

DYNAMIC MOORING SYSTEM FOR WATER WAVE ENERGY CONVERTORS

FIELD OF THE INVENTION

The present invention relates in general to energy harvesting from the ocean waves and in particular to Wave Energy Convertors (WECs).

BACKGROUND OF THE INVENTION

Ocean waves are a source of significant amount of renewable energy that are relatively concentrated, allowing for energy extraction using relatively small devices. Wave Energy Convertors (WECs) are one type of such energy extraction devices, at are held by a set of a buoy, which utilize the water wave motion to produce electrical energy. A typical WEC comprises of elements that move with respect to each other in response to passing water waves. The moving elements drive an energy transducer for generating useful energy.

U.S. Pat. No. 6,768,217 describes a WEC comprising a tube vertically movable relative to an anchored float, which tube is reciprocating in response to overpassing waves and driving a transducer for energy generation. The WEC also comprises a motion translator for reducing the transducer's stroke length and magnifying the force transmitted to the transducer, an energy buffer system for limiting the travel of the tube in response to excessively large surface waves, means for adjusting buoyancy in response to changing conditions, a pressure relief valve for automatically reducing excessive tube driving pressures.

U.S. Pat. No. 6,515,375 teaches an adaptive wave motion electrical generator comprising wire coil and magnet structure movable relatively to each other and generating electric current. The generator is capable to measure dynamic parameters (relative acceleration, velocity and displacement between the structures) as well as magnitudes of the current and voltage across the coil structure, and the amount of the current is controlled based on the dynamic parameters.

U.S. Pat. No. 6,798,090 to Cheung et al. arranges two neighboring moving magnets in opposite polarity, which, according to Cheung, allows intensifying the magnetic flux density in the proximity of the coils. Thus, both inventions utilize the well-known principle of electromagnetic induction resulting in an electric current being inducted in a conductive coil enclosing inside permanent magnets moving relatively to the coil. The faster the magnets move, the greater the electric current is.

For retaining the buoy in place, a common practice is to moor the buoy using three, 120-degree spaced apart mooring lines or cables, with each line being connected to an anchor by means of an intermediate "auxiliary surface buoy" (ASB) for supporting the weight of the mooring line. One such system is disclosed in Canadian Patent No. CA2643755C. A problem with this mooring arrangement, however, is that if a plurality of WECs is used, for increasing the amount of generated power, a mooring arrangement using three anchors and three ASBs for each WEC is both expensive and space consuming.

One issue with the current WEC plants that are fixed in space is that WECs leave behind a trail of diffracted waves with lesser energy potential. Therefore, by placing multiple WECs close to each other, the effective wave energy reduces. Once the first line of generators has harvested the energy in the waves, it takes kilometers for the waves to pick up their energy again and to be efficiently usable by the generators. To be effective, a WEC plant need to be able to produce sufficient energy. This is not achievable with few units and an array of WECs must be used. However, the current 'fixed' configurations have to space each WEC far away from each other to reduce the diffraction effects of the wave. This limits the scalability of such systems. In addition, they need costly mooring systems and have to run wires and subsea cables at much longer distance.

Wave interference, both constructive (summing amplitudes) and destructive (cancelling amplitudes), occurs within a WEC array when a wave encounters the first line of WEC. Current systems are fixed and thereby unable to predict or move to where constructive zones will occur, limiting their maximum output potential and packing density. Many wave energy generation farm designs place gaps at a large enough distance between WECs that they do not have to consider the effects of interference. This increases costs from mooring the WECs individually and connecting the systems to electricity infrastructure via subsea umbilical cables. This also uses up a much larger area of the ocean possibly disrupting marine ecosystems and shipping routes.

The waves may have changing amplitudes, periods and directions. Therefore, a fixed system cannot effectively use all wave characteristics, including the seasonality and other effects. The diffraction patterns of waves may change, and a fixed WEC system cannot adjust to resolve for such changes.

The present invention uses any type of WEC, such as the ones mentioned above, to generate energy. However, the WECs in the present system are movable with respect to each other to optimize the utilization of the wave energy.

SUMMARY OF THE INVENTION

The present system is a dynamic and adaptive mooring system for wave energy converters (WEC) that comprises of a mooring configuration anchored to a seafloor and to hold a set of fixed WECs and a set of movable WEC that are movable with respect to the set of fixed WECs; a plurality of sensors to collect a set of data related to a set of wave characteristics of incoming waves; a processing station having an optimization algorithm installed to receive the set of data and to determine a location within the mooring configuration that has a highest wave potential energy, and to control the movement of moving mechanism; a moving mechanism to move the set of movable WECs to the location of the highest wave potential energy; and a feedback loop between the plurality of sensors and the processing station to adjust and finetune an optimum placements for the WEC to optimize the energy transfer from the ocean waves to the WECs.

The present dynamic adaptive mooring system for wave energy converters (WEC) comprises of a set of fixed and set of movable WECs. When an incoming wave train interacts with the fixed WECs, a set of wave interference points, which have higher wave amplitudes than the incoming wave train, are formed downstream of the fixed WECs. The movable WECs are then positioned at the interface points to optimize the wave energy transfer. The present system significantly increases the energy harvesting efficiency as well as being scalable to build large WEC plants for large power generation. The dynamic characteristics of the present system utilizes the positive constructive wave interferences to increase the energy potential and to allow locating the WECs closer to each other.

One object of the present invention is to alleviate the problems with fixed systems by creating a dynamic and adaptive system. In this way the WEC can be placed much closer to each other by utilizing the interference patterns. The interference caused by the first line of WEC can be assessed and predicted by the lines of WEC behind the first line. The WEC are then moved to the maximum energy potential locations. The WEC can then harvest optimum energy at all different weather conditions and seasons no matter the direction or the amplitude of the incoming waves.

Another object of the present invention is to have a scalable WEC plant to reduce the cost of land acquisition, installation, maintenance, transportation and raw materials, as well as positively utilizing the wave diffraction process.

Another object of the present invention is to provide an economically feasible wave energy plant for independent power producers, wave energy converter industry, renewable energy industry, and government's power board.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

The presently disclosed dynamic and adaptive mooring system for wave energy converters (WEC), comprises of (i) a mooring system configured to hold a set of fixed and movable WEC; (ii) a set of sensors to predict the character and nature of the incoming waves using measurement tools and sensors; (iii) a computer or a processing station to calculate and determine the location of interference points of waves behind the set of fixed WECs, and (iv) a moving mechanism to move the set of movable WECs, using a motor trolley mechanism, to locations that will optimize the energy transfer from the ocean waves to the WECs. These systems work together in a feedback loop, adjusting and finding the optimum placements for the dynamic WECs.

Figure 1:
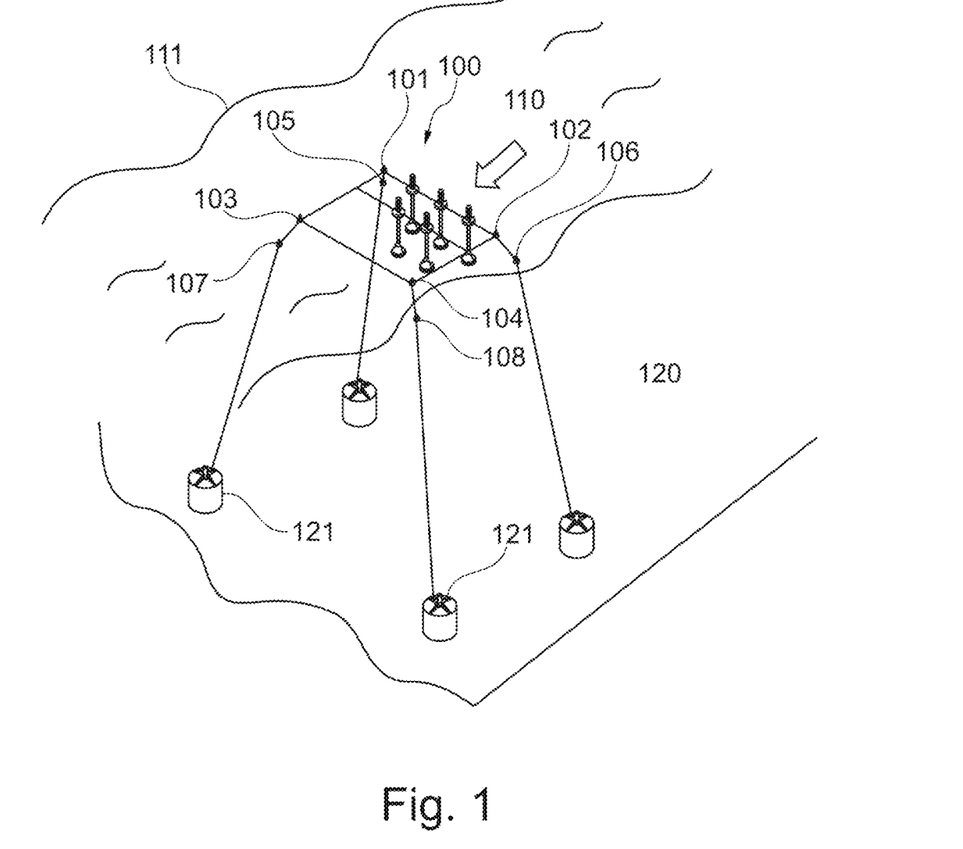
FIG. 1 shows one embodiment of the present system anchored to the water floor bed.

One embodiment of the present invention is shown in FIG. 1. The system comprises of a mooring system that holds an array of WECs. The mooring system is anchored to the seabed. The mooring system comprises of a three substantially parallel mooring lines that are held by two side mooring lines. The side mooring lines, defined by an X axis, which is substantially along the direction of the water wave flow, and the three parallel mooring lines, defined by a Y axis, which are traverse to the direction of the wave flow. The mooring system is held on the surface of the ocean water by several buoys set at several outer corners of the mooring system. In the embodiment shown in FIG. 1, there are four buoys. The WEC are mounted on a dynamic motor trolley system so that they can move along the lines. An active control system can change the distance between the first and the second traverse mooring lines. There are a set of auxiliary buoys, each auxiliary buoy being connected in turn to a respective anchor by a vertically descending anchoring line, wherein the auxiliary buoys prevent the mooring lines from weighing down the WECs.

The number of WEC on each line of fixed and movable WECs can be any number and the configuration in FIG. 1 is only one example of such a system. The main purpose of the present invention is to position WECs in such a manner that a predictable pattern of wave interferences is created downstream of the first 'fixed' line of generators. The location of the wave interference points is calculated and predicted by the present system, and the second, the third and other lines of WECs are then moved to the predicted locations. The mooring system is configured to hold the array of fixed and movable system in one configuration to manage the wave interferences and diffraction patterns for optimum energy utilization.

Figure 2:
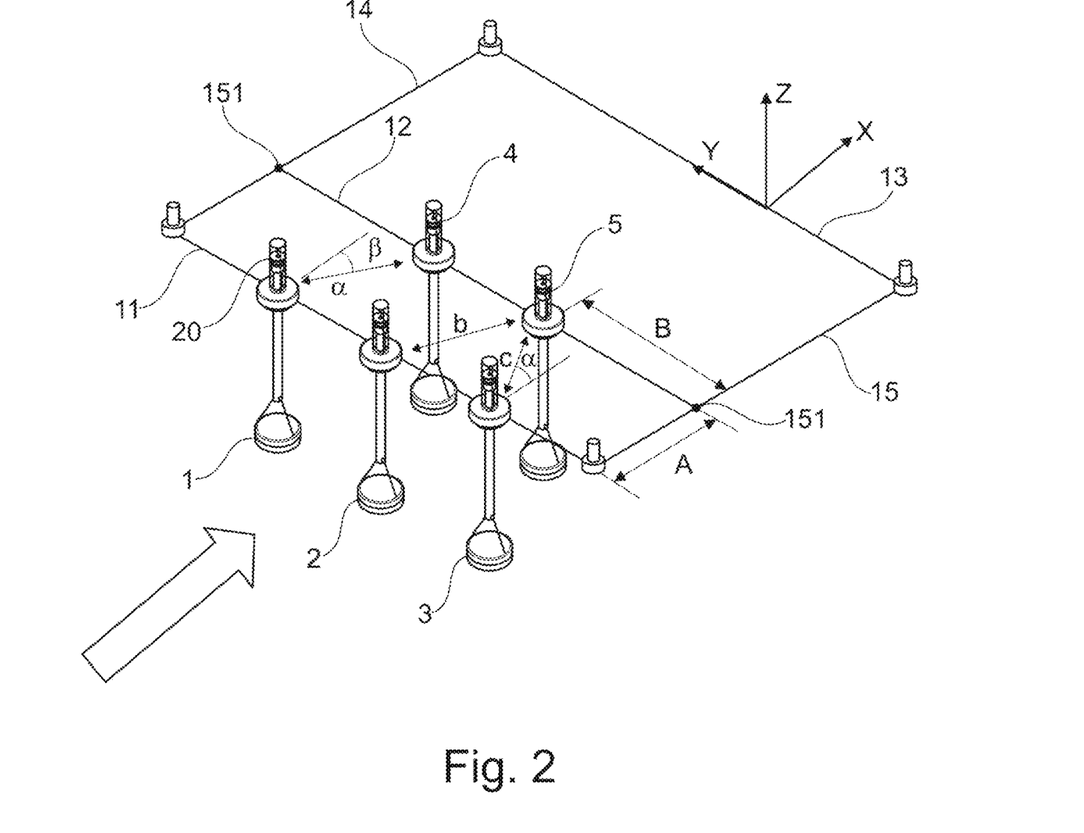
FIG. 2 shows one embodiment of the present system with three front WECs and two rear WECs.

One embodiment of the present system 100 is shown in FIGS. 1 and 2. A set of buoys 101, 102, 103, 104, hold a set of mooring lines 11, 12, 13, 14, 15, on the surface of an ocean water 110 that flows towards the system 100. Three front WECs, 1, 2, 3, (FIG. 2) are held on a front mooring line 11, and two rear WECs, 4, 5, are held on a rear mooring line 12. The system is completed with a third mooring line 13 and two side lines 14 and 15. Auxiliary buoys 105, 106, 107, 108 are used to anchor the mooring lines to the ocean floor 120, using anchors 121. The system 100 is only one embodiment of the present system. Other embodiments using more lines and each having more number of WECs can also be build.

There are two types of mooring lines, one is fixed that runs from one anchor point to the other (the first line that faces the incoming waves and the lines at the perimeter of an array connecting the mooring points). The other lines (e.g., the line behind the first fixed line) are connected at the ends on another dynamic motor trolley, which is mounted on the fixed wire that runs from one anchor point to another. This allows for a fixed first line of WEC and a dynamic set of lines behind it, that can adapt or move depending on the wave conditions.

Figure 3A:
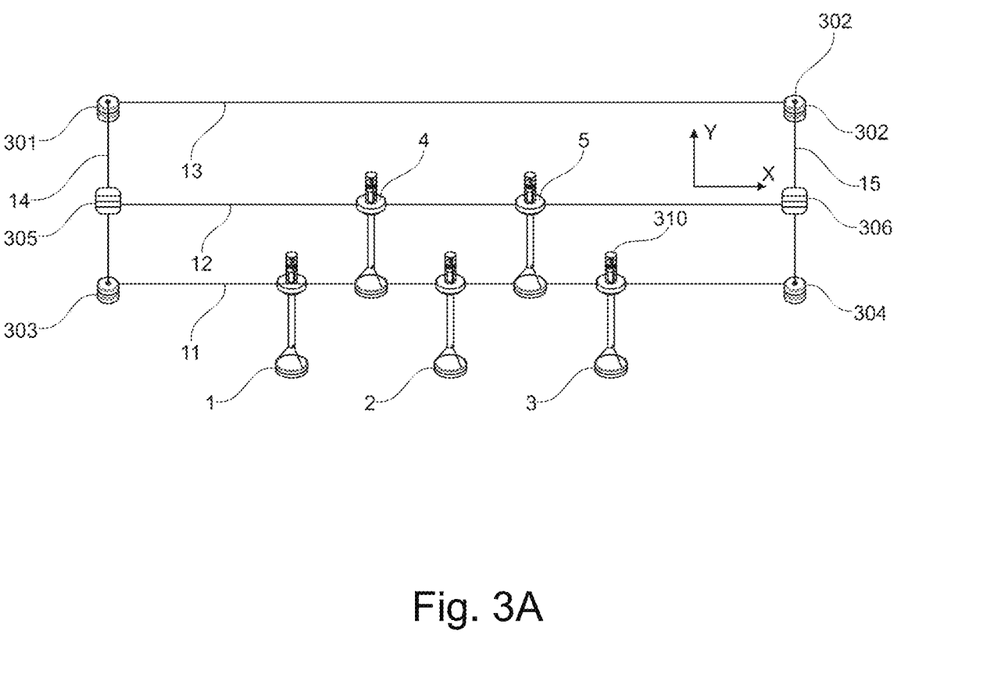
FIG. 3A shows one embodiment of the WEC moving mechanism.

The mooring lines of the present system are controlled using controlled motors and trolley system 301 and 302 (FIG. 3A), which are used to move the middle mooring line 12 along the Y axis. In addition, controlled motors and trolley system 305 and 306 are used to move the rear WECs 4 and 5 along the X axis. The motor trolley systems are mounted in a way that the cables connected via pulleys at each end form a skewed line one on top of the other in Z axis. Other moving mechanism such as winches or hoists can also be adapted to be used.

Figure 3B:
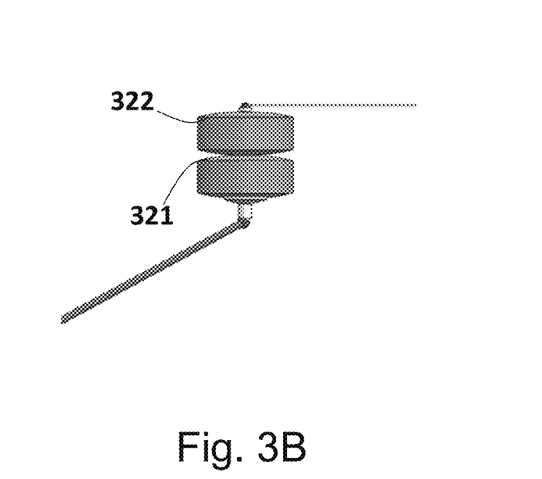
FIG. 3B shows one of the nodes of mooring system of present WEC mechanism.

FIG. 3B shows the mooring points at each corners of the array, 301, 302, 303 and 304. The floating mooring buoy comprise of two parts that are rotatably attached. The top part 321 is rotatably attached to the bottom part 322, which are floating bodies capable of rotating with respect to one another. The bottom part is directly connected to the mooring cables that may be directly or indirectly attached to the sea bed. The top part is directly connected to the cables on which the WECs are mounted. The purpose of this rotation is to allow for an extra degree of freedom of the array with respect to the anchoring points. Other mechanisms can be used to move the WEC with respect to each other and provide more degrees of freedom of WECs. In one embodiment, a set of belt and pully systems (not shown) can be used to mover the WECs. In another embodiment, the WEC can also be moved along the X axis and also their spacing can be changed.

In the present system, there are two types of WECs: Standard and equipped. The standard WEC are similar to the conventionally available WECs. The equipped WEC have several sensors and cameras to characterize the incoming waves. These sensors are installed on the tower of the WEC. A standard WEC is an elongated, neutrally or slightly buoyant member that is positioned in the water in an upright orientation. Its buoyancy is designed to locate it at a particular depth beneath the water surface. There is a vertically moving member inside the WEC, which is connected to a mechanical energy transducer to convert vertical movements of the member, in response to over-passing Surface waves, to useful energy. WECs can be in different sizes to accommodate the wave size and energy at the location that they are installed. More details of different embodiments of WECs are provided in the prior art, such as those in U.S. Pat. Nos. 6,768,217, 6,515,375, and 6,798,090.

Figure 4:
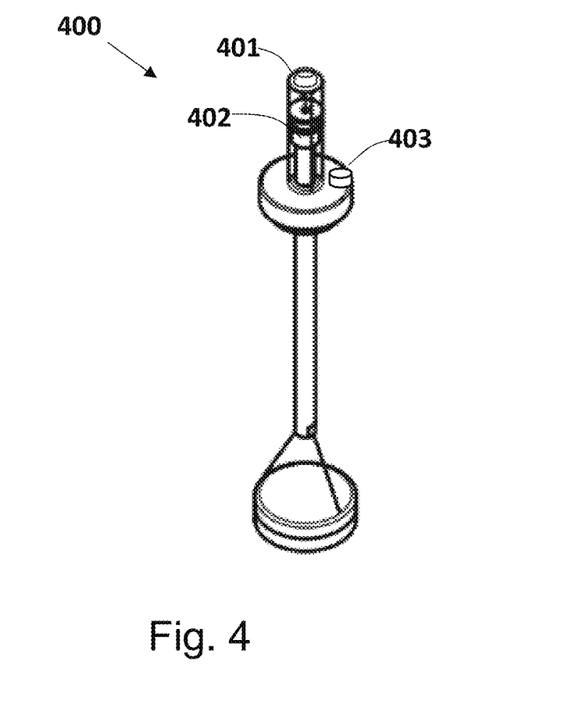
FIG. 4 shows a WEC of the present invention.

FIG. 4 shows a WEC, 400, of the present system, which is equipped with a camera, 401, gyroscope, accelerometer, and wave gage, 402, and ultrasound sensors 403 (mounted on the first line of generators, WEC 1,2,3) to determine the incoming water wave characteristics. The invention of the 'Dynamic Adaptive Mooring System' can adapt to the changing wave conditions such as the incident direction of the waves, wave period, amplitude and seasonal currents. The system can recognize characteristics of incoming waves and based on that, direct the control system so that the WEC in an array are positioned appropriately to harvest optimum energy at all hours of the day and at all seasons.

Wavelength, wave velocity, wave direction (angle with respect to perpendicular) and wave amplitude is monitored and measured through built in camera, gyroscope, accelerometer and ultrasound sensors (mounted on the first line of generators). This information is processed using the optimization algorithm to mathematically predict the locus of constructive interference (behind the first line of generators).

Figure 5:
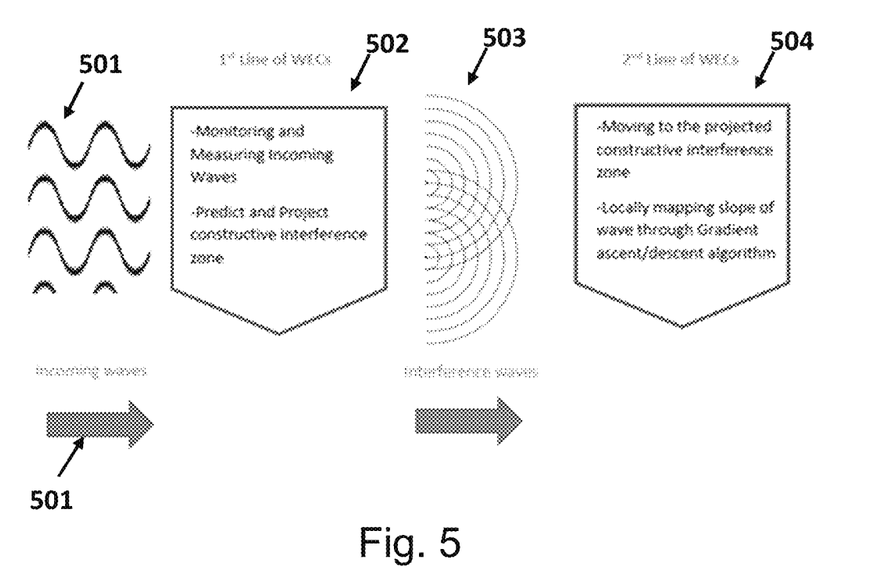
FIG. 5 shows a flow chart of the system operation.

FIG. 5 shows a flow chart of the operation of one embodiment of the present system. As a wave 501 approaches the WEC system, the first line of WECs are equipped with the monitoring and measuring systems to monitor and measure wave direction and velocity 502. The wave information are obtained by the instruments and provided to the control system installed on a processing station. The processing station can be on one of the WECs or on a remote location with wireless communication. The control system after receiving the wave information, determines the required distance between the first and the second lines such that the second line of generators need to move to be able to position itself within the zone of constructive interference 503. The control system calculates this distance relative in two axes (X,Y). Information about this location in X and Y axes is propagated to the motor trolley mechanism within the control system. The motor trolley system are then actuated, which move the generators 4 and 5 to the determined location. The optimum location for maximum energy harvesting is determined based on an iterative movement and calculation process 504. As shown in FIG. 2, motion along the X axis changes the distance A between the fixed and movable mooring lines, and therefore, the distances "a" and "b" between the WECs. And a movement along the Y axis changes the angles α and β between the sets of fixed and movable WECs.

Figure 6:
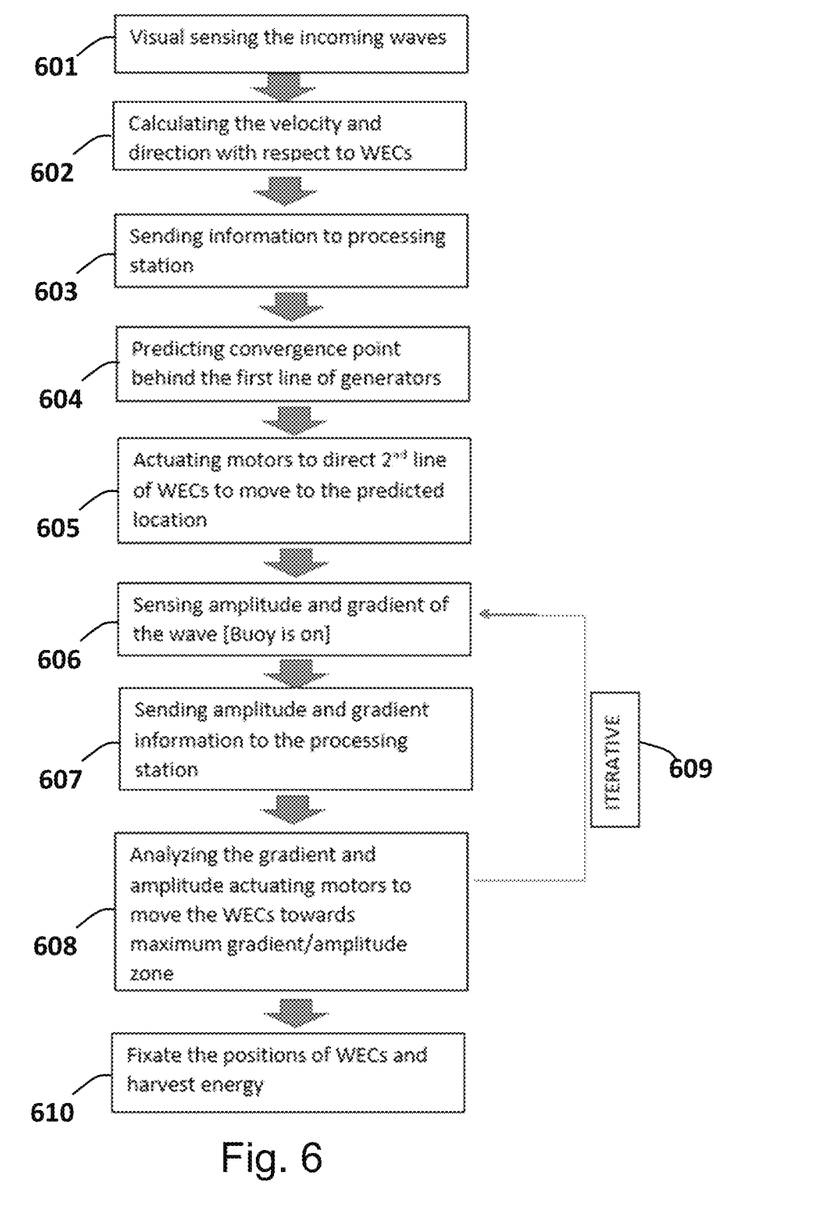
FIG. 6 shows a flowchart for the entire system of calculations.

FIG. 6 shows a flow chart of the operation of a preferred embodiment of the present WEC system. A set of cameras on the front WECs detect the incoming waves 601. The time resolved images are used to calculate the velocity and direction of the incoming waves with respect to the WECs 602. The processing station 603 uses velocity and direction information and calculates and predicts the convergence points of the waves behind the first line of WECs 604. The processing station actuates the motors to direct the second line of WECs to move them to the predicted convergence points of the waves 605. From this point on the processing station obtains more information to optimize the energy transfer. For this purpose, the sensors on the WECs determine the amplitude and gradient of the waves 606. The amplitude and gradient information is sent to the processing station 607. This information is analyzed to move the WECs towards the location that has the maximum amplitude and gradient 608. The system may go through several iterations 609 to determine the location for the maximum wave energy transfer. Once the maximum energy location is obtained, the WEC is fixed on that location to harvest the wave energy 610.

In one embodiment, the sensors and actuating motors are on site, and the data collected from the sensors are transmitted continuously via satellite to the ground control station. The computers on ground do the data processing and send back the actuation signals to the motors for movement instructions. The process is automated. In another embodiment, the processing station is installed on one of the WECs.

The trolley system allows for refining the location of the WECs to maximize the energy harvesting. The amplitude and the gradient of the waves are determined at any new location. A built-in gyroscope is able to determine the slope and using an algorithm, such as "gradient ascent/descent" algorithm, the maximum slope and hence the maximum amplitude of the wave around that location is determined. The gradient ascent/descent algorithm, is a first-order iterative optimization algorithm for finding a local maximum/minimum of a differentiable function, which represents the wave. Through this process, an objective verification of maximum wave height is acquired. Maximum wave height directly corresponds to the maximum potential energy stored in the waves. The WECs are then moved to the location with the maximum potential energy, Therefore, by exploiting the maximum wave height, the present system can yield the maximum energy harvesting attainable within a wave energy farm.

The wave amplitude, wave length and wave velocity can be measured by any of currently known methods such as ball float method, GPS positioning mode, satellite photographic process, laser acquisition method and X-band radar method etc. One method that is used in the present system is by a set of accelerometers set on the first line of WECs and a second set of accelerometers set on the second line of WECs. The time of arrival of a wave is recorded by each accelerometer. The average time of arrival of the wave for the first line is subtracted from the average time of the arrival of the wave recorded by the second line. Then the velocity is obtained based on dividing the distance between the two lines and this time difference. The wave length can be determined based on using time difference between two consecutive wave as recorded on one accelerometer. The local wavelength is then the velocity multiply by this time. A wave gauge is used to measure wave height and period. There are a variety of wave gauges. The basic principles of operation of wave gauges are the recording of changes in the hydrostatic pressure produced by passing waves, the oscillations of a buoy floating freely on the surface of a body of water, the transit time of ultrasonic signals from a radiator to a receiver after being reflected from the disturbed surface of the body of water, and the changes in the DC resistance of an electrical-contact or wire transducer as waves pass through them. The individual operating principles are combined in some designs.

An algorithms based on reinforcement learning for the passive and active control of wave energy converters (WECs) is used. The wave height and wave period are recorded and used to teach the algorithm, which then optimizes the location of the WECs. The algorithm learns over time to optimize the location of the WECs. It received the wave information from the sensors and selects optimum location of the second row of the WECs, and send the new locations to the controller to move them to their calculated locations. The algorithm is based on a neural network to produce the non-linear mapping between mean generated power and maximum displacement amplitude with significant wave height, wave energy period and control parameters in each time interval.

The algorithm receives information from the fixed front WECs. This real-time approach provides a robust approach for dealing with constraints on the displacement, velocity, force and power flow. The wave elevation forecasting is very important for the maximization of energy absorption and the meeting of realistic constraints. The neural networks strategy employs information on the predicted wave conditions.

The energy content in waves is subdivided into packets, known as wave groups. With the use of a network of WECs, the information in each wave group is determined. The controller can then adapt the control parameters based on the predicted incoming wave groups. Modifying the present system to the treatment of wave groups makes the control scheme more responsive, with a predicted increase in performance. The prediction of incoming wave groups is also feasible with the use of wave buoys.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A dynamic and adaptive mooring system for wave energy converters (WEC), comprising:
  a) a mooring configuration, anchored to a seafloor, having a set of fixed mooring lines, and a set of movable mooring lines;
  b) a set of fixed WECs held by the set of fixed mooring lines;
  c) a set of movable WECs held on the set of movable mooring lines;
  d) a plurality of sensors to collect a set of data related to a set of wave characteristics of a set of incident waves approaching the set of fixed WECs;
  e) a moving mechanism for moving the set of movable WECs;
  f) a processing station having an optimization algorithm receiving the set of data and to determine a location within the mooring configuration that has a highest wave potential energy, and to control the movement of the moving mechanism, and;
  g) a feedback loop between the plurality of sensors and the processing station to adjust the location of the set of movable WECs to optimize the energy transfer from the ocean waves, and;
  h) the mooring configuration comprises outer parallel mooring lines having four corners that are being held by four rotatable buoys, wherein each rotatable buoy comprises a top part that is rotatably attached to a bottom part, and wherein the bottom part is directly connected to the mooring lines that may be directly or indirectly attached to the seafloor, and the top part is directly connected to the mooring lines on which the WECs are mounted.

2. The system of claim 1, wherein the set of movable mooring lines are substantially parallel to and located downstream of the set of fixed mooring lines and defining a position plane having an X axis that describes the distance between the set of fixed and movable mooring lines, and a Y axis that describes the distance along the movable mooring line.

3. The system of claim 2, wherein the moving mechanism is configured to move the set of movable WECs along the X axis to change the distance between the sets of fixed and movable WECs.

4. The system of claim 2, wherein the moving mechanism is configured to move the set of movable WECs along the Y axis to change a set of angles between the sets of fixed and movable WECs.

5. The system of claim 1, wherein the plurality of sensors to collect a set of data are installed on the set of fixed WECs.

6. The system of claim 1, wherein the plurality of sensors are selected from a group consisting of cameras, gyroscopes, accelerometers, wave gages, ball floats, radars, sonars, and ultrasound sensors to determine the wave characteristics comprising of an incident direction of the waves, a wave velocity, a wave period, a wave amplitude, and a rate of growth of wave amplitude.

7. The system of claim 1, further having GPS positioning system, satellite photographic process, laser acquisition system and X-band radar system to determine wave characteristics.

8. The system of claim 1, wherein the moving mechanism comprises a motor trolley mechanism installed on the mooring system.

9. The system of claim 1, wherein the processing station is located offshore and having a wireless communication to control the moving mechanism and the operation of the WECs or is located on one of WECs.

10. The system of claim 1, wherein the optimization algorithm comprises of an algorithm that can mathematically predict a set of locations of constructive wave interferences downstream of the set of fixed WECs.

11. The system of claim 10, wherein the optimization algorithm further comprising a gradient ascent/descent algorithm to determine the location of a maximum wave amplitude and a gradient maximum wave amplitude where the maximum potential energy is stored in the waves.

12. The system of claim 10, wherein the optimization algorithm is based on a neural network model to produce a non-linear mapping between a mean generated power and a maximum displacement amplitude with a significant wave height, a wave energy period and a set of control parameters in each time interval to further learn over time to optimize the location of the WECs.

* * * * *